(12) United States Patent
Seo et al.

(10) Patent No.: US 7,606,463 B2
(45) Date of Patent: Oct. 20, 2009

(54) RECORDING MEDIUM HAVING DATA STRUCTURE FOR MANAGING PLAYBACK CONTROL AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 643 days.

(21) Appl. No.: 10/782,866

(22) Filed: Feb. 23, 2004

(65) Prior Publication Data

US 2004/0165861 A1 Aug. 26, 2004

(30) Foreign Application Priority Data

Feb. 24, 2003 (KR) .................... 10-2003-0011522

(51) Int. Cl.
  *G11B 27/00* (2006.01)
(52) U.S. Cl. ...................... 386/55; 386/92; 386/125
(58) Field of Classification Search ................ 386/69, 386/95, 96, 111, 126, 92, 125; 369/30.05, 369/53.1–53.3, 275.3
  See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,583,652 A | 12/1996 | Ware | |
| 5,602,956 A | 2/1997 | Suzuki et al. | |
| 5,630,006 A | * 5/1997 | Hirayama et al. | ............. 386/92 |
| 5,633,839 A | 5/1997 | Alexander et al. | |
| 5,651,010 A | 7/1997 | Kostreski et al. | |
| 5,691,972 A | 11/1997 | Tsuga et al. | |
| 5,703,997 A | 12/1997 | Kitamura et al. | |
| 5,729,549 A | 3/1998 | Kostreski et al. | |
| 5,732,185 A | 3/1998 | Hirayama et al. | |
| 5,734,788 A | 3/1998 | Nonomura et al. | |
| 5,742,569 A | 4/1998 | Yamamoto et al. | |
| 5,745,643 A | 4/1998 | Mishina | |
| 5,747,136 A | 5/1998 | Shono et al. | |
| 5,771,334 A | 6/1998 | Yamauchi et al. | |
| 5,784,528 A | 7/1998 | Yamane et al. | |
| 5,835,493 A | 11/1998 | Magee et al. | |
| 5,854,873 A | 12/1998 | Mori et al. | |

(Continued)

FOREIGN PATENT DOCUMENTS

CN 1134583 10/1996

(Continued)

OTHER PUBLICATIONS

International Search Report dated May 22, 2004.

(Continued)

*Primary Examiner*—Thai Tran
*Assistant Examiner*—Mishawn Dunn
(74) *Attorney, Agent, or Firm*—Harness Dickey & Pierce P.L.C.

(57) ABSTRACT

The data structure on the recording medium includes a navigation area storing an information file. The information file includes a plurality of navigation segments representing one or more reproduction paths of a title. Each of the navigation segments includes at least one navigation command, and a number of the navigation segments each include a navigation command for launching a playlist. One of the navigation segments is an entry navigation segment of the title.

14 Claims, 5 Drawing Sheets

U.S. PATENT DOCUMENTS

| | | | |
|---|---|---|---|
| 5,870,523 | A | 2/1999 | Kikuchi et al. |
| 5,877,817 | A | 3/1999 | Moon |
| 5,884,004 | A | 3/1999 | Sato et al. |
| 5,907,658 | A | 5/1999 | Murase et al. |
| 5,909,257 | A | 6/1999 | Ohishi et al. |
| 5,913,010 | A | 6/1999 | Kaneshige et al. |
| 5,917,781 | A | 6/1999 | Kim |
| 5,923,869 | A | 7/1999 | Kashiwagi et al. |
| 5,933,410 | A | 8/1999 | Nakane et al. |
| 5,940,255 | A | 8/1999 | Uwabo et al. |
| 5,949,792 | A | 9/1999 | Yasuda et al. |
| 5,953,187 | A | 9/1999 | Uwabo et al. |
| 5,953,290 | A | 9/1999 | Fukuda et al. |
| 5,987,126 | A | 11/1999 | Okuyama et al. |
| 5,999,694 | A | 12/1999 | Yasuda et al. |
| 5,999,698 | A | 12/1999 | Nakai et al. |
| 6,009,234 | A | 12/1999 | Taira et al. |
| 6,014,495 | A | 1/2000 | Moriyama et al. |
| 6,031,962 | A | 2/2000 | Sawabe et al. |
| 6,035,095 | A | 3/2000 | Kaneshige et al. |
| 6,064,385 | A | 5/2000 | Sturgeon et al. |
| 6,064,796 | A | 5/2000 | Nakamura et al. |
| 6,067,400 | A | 5/2000 | Saeki et al. |
| 6,084,581 | A | 7/2000 | Hunt |
| 6,097,676 | A | 8/2000 | Fujinami |
| 6,118,927 | A | 9/2000 | Kikuchi et al. |
| 6,130,869 | A | 10/2000 | Tokoro et al. |
| 6,167,189 | A | 12/2000 | Taira et al. |
| 6,181,870 | B1 | 1/2001 | Okada et al. |
| 6,181,872 | B1 | 1/2001 | Yamane et al. |
| 6,195,726 | B1 | 2/2001 | Hogan |
| 6,215,746 | B1 | 4/2001 | Ando et al. |
| 6,219,488 | B1 | 4/2001 | Mori et al. |
| 6,222,805 | B1 | 4/2001 | Mori et al. |
| 6,247,022 | B1 | 6/2001 | Yankowski |
| 6,282,320 | B1 | 8/2001 | Hasegawa et al. |
| 6,285,825 | B1 | 9/2001 | Miwa et al. |
| 6,292,226 | B1 | 9/2001 | Yamanaka et al. |
| 6,308,005 | B1 | 10/2001 | Ando et al. |
| 6,308,006 | B1 | 10/2001 | Yamamoto et al. |
| 6,321,027 | B2 | 11/2001 | Honjo |
| 6,336,002 | B1 | 1/2002 | Yamauchi et al. |
| 6,343,062 | B1 | 1/2002 | Furukawa et al. |
| 6,351,442 | B1 | 2/2002 | Tagawa et al. |
| 6,353,613 | B1 | 3/2002 | Kubota et al. |
| 6,356,971 | B1 | 3/2002 | Katz et al. |
| 6,360,055 | B1 | 3/2002 | Kaneshige et al. |
| 6,373,803 | B2 | 4/2002 | Ando et al. |
| 6,377,474 | B1 | 4/2002 | Archambeault et al. |
| 6,377,518 | B1 | 4/2002 | Auwens et al. |
| 6,377,747 | B1 | 4/2002 | Murase et al. |
| 6,381,404 | B1 | 4/2002 | deCarmo |
| 6,385,388 | B1 | 5/2002 | Lewis et al. |
| 6,385,389 | B1 | 5/2002 | Maruyama et al. |
| 6,385,394 | B1 | 5/2002 | Okada et al. |
| 6,385,398 | B1 | 5/2002 | Matsumoto |
| 6,392,969 | B1 | 5/2002 | Heo |
| 6,393,430 | B1 | 5/2002 | Van Ryzin |
| 6,393,574 | B1 | 5/2002 | Kashiwagi et al. |
| 6,415,101 | B1 | 7/2002 | DeCarmo et al. |
| 6,424,793 | B1 | 7/2002 | Setogawa et al. |
| 6,424,797 | B1 | 7/2002 | Murase et al. |
| 6,445,872 | B1 | 9/2002 | Sano et al. |
| 6,470,140 | B1 | 10/2002 | Sugimoto et al. |
| 6,470,460 | B1 | 10/2002 | Kashiwagi et al. |
| 6,515,101 | B1 | 2/2003 | Sheares |
| 6,532,334 | B1 | 3/2003 | Kikuchi et al. |
| 6,546,195 | B2 | 4/2003 | Kashiwagi et al. |
| 6,556,774 | B2 | 4/2003 | Tsumagari et al. |
| 6,564,006 | B1 | 5/2003 | Mori et al. |
| 6,567,608 | B2 | 5/2003 | Mori et al. |
| 6,570,837 | B1 | 5/2003 | Kikuchi et al. |
| 6,573,819 | B1 | 6/2003 | Oshima et al. |
| 6,580,870 | B1 | 6/2003 | Kanazawa et al. |
| 6,584,277 | B2 | 6/2003 | Tsumagari et al. |
| 6,603,517 | B1 | 8/2003 | Shen et al. |
| 6,615,192 | B1 | 9/2003 | Tagawa et al. |
| 6,618,396 | B1 | 9/2003 | Kondo et al. |
| 6,647,496 | B1 | 11/2003 | Tagawa et al. |
| 6,654,543 | B2 | 11/2003 | Ando et al. |
| 6,700,839 | B1 | 3/2004 | Auflick et al. |
| 6,727,421 | B2 | 4/2004 | Izawa et al. |
| 6,763,345 | B1 | 7/2004 | Hempleman et al. |
| 6,766,103 | B2 | 7/2004 | Kim et al. |
| 6,782,192 | B1 | 8/2004 | Tanaka et al. |
| 6,788,883 | B1 | 9/2004 | Park et al. |
| 6,795,499 | B1 | 9/2004 | Kato et al. |
| 6,798,981 | B1 | 9/2004 | Yamauchi et al. |
| 6,801,713 | B1 | 10/2004 | Yagawa et al. |
| 6,832,293 | B1 | 12/2004 | Tagawa et al. |
| 6,859,421 | B2 | 2/2005 | Sawabe et al. |
| 6,901,078 | B2 | 5/2005 | Morris |
| 6,904,227 | B1 | 6/2005 | Yamamoto et al. |
| 6,912,218 | B1 | 6/2005 | Jeon |
| 6,914,863 | B2 | 7/2005 | Ono |
| 6,965,727 | B1 | 11/2005 | Sawabe et al. |
| 6,999,674 | B1 | 2/2006 | Hamada et al. |
| 7,006,758 | B1 | 2/2006 | Yamamoto et al. |
| 7,024,102 | B1 | 4/2006 | Inoshita et al. |
| 7,050,384 | B2 * | 5/2006 | Sasaki ..................... 369/275.3 |
| 7,065,287 | B1 | 6/2006 | Heredia et al. |
| 7,072,573 | B2 | 7/2006 | Okada et al. |
| 7,113,694 | B2 | 9/2006 | Kim et al. |
| 7,124,303 | B2 | 10/2006 | Candelore et al. |
| 7,236,687 | B2 | 6/2007 | Kato et al. |
| 2001/0014070 | A1 | 8/2001 | Ando et al. |
| 2001/0026679 | A1 | 10/2001 | Koshino et al. |
| 2001/0030710 | A1 | 10/2001 | Werner |
| 2001/0031127 | A1 | 10/2001 | Honjo |
| 2001/0033517 | A1 | 10/2001 | Ando et al. |
| 2001/0036358 | A1 | 11/2001 | Kim et al. |
| 2001/0038745 | A1 | 11/2001 | Sugimoto et al. |
| 2001/0043790 | A1 | 11/2001 | Saeki et al. |
| 2001/0053280 | A1 | 12/2001 | Yamauchi et al. |
| 2002/0001385 | A1 | 1/2002 | Kawada et al. |
| 2002/0015383 | A1 | 2/2002 | Ueno |
| 2002/0015581 | A1 | 2/2002 | Ando et al. |
| 2002/0018416 | A1 | 2/2002 | Heo |
| 2002/0021761 | A1 | 2/2002 | Zhang et al. |
| 2002/0031336 | A1 | 3/2002 | Okada et al. |
| 2002/0041557 | A1 | 4/2002 | Heo |
| 2002/0046328 | A1 | 4/2002 | Okada |
| 2002/0076201 | A1 | 6/2002 | Tsumagari et al. |
| 2002/0093556 | A1 | 7/2002 | Ishizawa et al. |
| 2002/0093886 | A1 | 7/2002 | Ijichi et al. |
| 2002/0097981 | A1 | 7/2002 | Seo et al. |
| 2002/0106196 | A1 | 8/2002 | Yamauchi et al. |
| 2002/0126994 | A1 | 9/2002 | Gunji et al. |
| 2002/0127002 | A1 | 9/2002 | Mori et al. |
| 2002/0129036 | A1 | 9/2002 | Ho Yuen Lok et al. |
| 2002/0135608 | A1 | 9/2002 | Hamada et al. |
| 2002/0145702 | A1 | 10/2002 | Kato et al. |
| 2002/0150383 | A1 | 10/2002 | Kato et al. |
| 2002/0159368 | A1 | 10/2002 | Noda et al. |
| 2002/0177914 | A1 | 11/2002 | Chase |
| 2002/0180803 | A1 | 12/2002 | Kaplan et al. |
| 2002/0196365 | A1 | 12/2002 | Cho et al. |
| 2002/0197059 | A1 | 12/2002 | Cho et al. |
| 2003/0002194 | A1 | 1/2003 | Andoh |
| 2003/0007780 | A1 | 1/2003 | Senoh |
| 2003/0026597 | A1 | 2/2003 | Cho et al. |
| 2003/0035681 | A1 | 2/2003 | Ho |
| 2003/0058948 | A1 | 3/2003 | Kelly et al. |
| 2003/0103604 | A1 | 6/2003 | Kato et al. |

| | | | | | | |
|---|---|---|---|---|---|---|
| 2003/0118327 A1 | 6/2003 | Um et al. | | EP | 0873022 | 10/1998 |
| 2003/0123346 A1 | 7/2003 | Ishii et al. | | EP | 0 911 825 A2 | 4/1999 |
| 2003/0123845 A1 | 7/2003 | Koda et al. | | EP | 0917355 | 5/1999 |
| 2003/0123849 A1 | 7/2003 | Nallur et al. | | EP | 0918438 | 5/1999 |
| 2003/0133509 A1 | 7/2003 | Yanagihara et al. | | EP | 0920203 | 6/1999 |
| 2003/0147322 A1 | 8/2003 | Ono | | EP | 0940983 | 9/1999 |
| 2003/0161615 A1 | 8/2003 | Tsumagari et al. | | EP | 0949622 | 10/1999 |
| 2003/0221055 A1 | 11/2003 | Okada | | EP | 1126454 | 7/2000 |
| 2003/0235403 A1 | 12/2003 | Seo et al. | | EP | 1024494 | 8/2000 |
| 2003/0235404 A1 | 12/2003 | Seo et al. | | EP | 1050880 | 11/2000 |
| 2004/0014136 A1 | 1/2004 | Ishii et al. | | EP | 1081885 | 3/2001 |
| 2004/0019396 A1* | 1/2004 | McMahon et al. ............ 700/94 | | EP | 1103974 | 5/2001 |
| 2004/0047588 A1 | 3/2004 | Okada et al. | | EP | 1041565 | 9/2001 |
| 2004/0047591 A1 | 3/2004 | Seo et al. | | EP | 1148503 | 10/2001 |
| 2004/0076402 A1 | 4/2004 | Jung et al. | | EP | 1041569 | 1/2002 |
| 2004/0086261 A1 | 5/2004 | Hanes | | EP | 1198132 | 4/2002 |
| 2004/0114908 A1 | 6/2004 | Ito | | EP | 1198133 | 4/2002 |
| 2004/0156621 A1 | 8/2004 | Seo et al. | | EP | 1 205 933 | 5/2002 |
| 2004/0179819 A1 | 9/2004 | Cho et al. | | EP | 1202568 | 5/2002 |
| 2004/0179820 A1 | 9/2004 | Kashiwagi et al. | | EP | 1469677 | 10/2002 |
| 2004/0179827 A1 | 9/2004 | Cho et al. | | EP | 1 271 526 | 1/2003 |
| 2004/0208135 A1 | 10/2004 | Nakamura et al. | | EP | 1280348 | 1/2003 |
| 2004/0213105 A1 | 10/2004 | Seo et al. | | EP | 1398965 | 3/2004 |
| 2004/0220791 A1 | 11/2004 | Lamkin et al. | | EP | 1391119 | 6/2006 |
| 2004/0247290 A1 | 12/2004 | Seo et al. | | JP | 64-003781 | 1/1989 |
| 2004/0252975 A1 | 12/2004 | Cho et al. | | JP | 01-116819 | 5/1989 |
| 2005/0019007 A1* | 1/2005 | Kato et al. .................... 386/69 | | JP | 08-088832 | 4/1996 |
| 2005/0025459 A1 | 2/2005 | Kato et al. | | JP | 08-235833 | 9/1996 |
| 2005/0036763 A1 | 2/2005 | Kato et al. | | JP | 08-273304 | 10/1996 |
| 2005/0232111 A1 | 10/2005 | Sawabe et al. | | JP | 09-023403 | 1/1997 |
| 2006/0013564 A1 | 1/2006 | Hamada et al. | | JP | 09-135421 | 5/1997 |
| 2006/0110132 A1 | 5/2006 | Takakuwa et al. | | JP | 09-251759 | 9/1997 |
| 2006/0222340 A1 | 10/2006 | Yamauchi et al. | | JP | 10-040667 | 2/1998 |
| 2008/0019672 A1 | 1/2008 | Hamasaka et al. | | JP | 10-051737 | 2/1998 |
| 2008/0253742 A1 | 10/2008 | Hamada et al. | | JP | 10-269698 | 10/1998 |
| | | | | JP | 10-271449 | 10/1998 |
| FOREIGN PATENT DOCUMENTS | | | | JP | 10-299698 | 11/1998 |
| | | | | JP | 11-041563 | 2/1999 |
| CN | 1212427 | 3/1999 | | JP | 11-69308 | 3/1999 |
| CN | 1220458 | 6/1999 | | JP | 11-69309 | 3/1999 |
| CN | 1237852 | 12/1999 | | JP | 11-96653 | 4/1999 |
| CN | 1239574 | 12/1999 | | JP | 11-103444 | 4/1999 |
| CN | 1251461 | 4/2000 | | JP | 11-120747 | 4/1999 |
| CN | 1272209 | 11/2000 | | JP | 11-134812 | 5/1999 |
| CN | 1310445 | 8/2001 | | JP | 10-032780 | 6/1999 |
| CN | 1317200 | 10/2001 | | JP | 11-161663 | 6/1999 |
| CN | 1320926 | 11/2001 | | JP | 11-185463 | 7/1999 |
| CN | 1321319 | 11/2001 | | JP | 11-213522 | 8/1999 |
| CN | 1346491 | 4/2002 | | JP | 11-213627 | 8/1999 |
| CN | 1393872 | 1/2003 | | JP | 11-259976 | 9/1999 |
| CN | 1251680 | 8/2003 | | JP | 11-259985 | 9/1999 |
| CN | 1205793 | 11/2003 | | JP | 2002-150685 | 9/1999 |
| CN | 1163673 | 6/2004 | | JP | 1999-296997 | 10/1999 |
| CN | 1509572 | 6/2004 | | JP | 11-346341 | 12/1999 |
| CN | 1263345 | 9/2004 | | JP | 2000-001130 | 1/2000 |
| CN | 1555058 | 12/2004 | | JP | 2000-021130 | 1/2000 |
| CN | 1571055 | 1/2005 | | JP | 2000-030414 | 1/2000 |
| CN | 1606355 | 4/2005 | | JP | 2000-041066 | 2/2000 |
| CN | 1606356 | 4/2005 | | JP | 2000-067522 | 3/2000 |
| CN | 1606357 | 4/2005 | | JP | 2000-069437 | 3/2000 |
| CN | 1611071 | 4/2005 | | JP | 2000-113602 | 4/2000 |
| CN | 1364387 | 11/2005 | | JP | 2000-149405 | 5/2000 |
| CN | 1383679 | 1/2006 | | JP | 2000-149514 | 5/2000 |
| EP | 0723216 | 7/1996 | | JP | 2000-195235 | 7/2000 |
| EP | 0724264 | 7/1996 | | JP | 2000-222822 | 8/2000 |
| EP | 0737009 | 10/1996 | | JP | 2000-235779 | 8/2000 |
| EP | 0737980 | 10/1996 | | JP | 2000-235780 | 8/2000 |
| EP | 0831647 | 3/1998 | | JP | 2000-236496 | 8/2000 |
| EP | 0836183 | 4/1998 | | JP | 2000-293938 | 10/2000 |
| EP | 0836189 | 4/1998 | | JP | 2000-299836 | 10/2000 |
| EP | 0847198 | 6/1998 | | JP | 12-331466 | 11/2000 |
| EP | 0858073 | 8/1998 | | JP | 2000-322827 | 11/2000 |
| EP | 0872839 | 10/1998 | | JP | 2000-322875 | 11/2000 |

| | | |
|---|---|---|
| JP | 2000-348442 | 12/2000 |
| JP | 2000-348467 | 12/2000 |
| JP | 2001-024985 | 1/2001 |
| JP | 2001-067802 | 3/2001 |
| JP | 2001-111929 | 4/2001 |
| JP | 2001-111960 | 4/2001 |
| JP | 2001-157145 | 6/2001 |
| JP | 2001-157208 | 6/2001 |
| JP | 2001-169246 | 6/2001 |
| JP | 3199243 | 6/2001 |
| JP | 3199711 | 6/2001 |
| JP | 2001-195809 | 7/2001 |
| JP | 2001-297535 | 10/2001 |
| JP | 2001-332006 | 11/2001 |
| JP | 2001-359072 | 12/2001 |
| JP | 2002-025231 | 1/2002 |
| JP | 2002-082838 | 3/2002 |
| JP | 2002-083486 | 3/2002 |
| JP | 2002-112179 | 4/2002 |
| JP | 2002-158972 | 5/2002 |
| JP | 2002-158974 | 5/2002 |
| JP | 3392838 | 5/2002 |
| JP | 2002-216460 | 8/2002 |
| JP | 2002-222581 | 8/2002 |
| JP | 2002-288942 | 10/2002 |
| JP | 2002-112201 | 12/2002 |
| JP | 2002-352515 | 12/2002 |
| JP | 2003-059241 | 2/2003 |
| JP | 3379961 | 2/2003 |
| JP | 3392849 | 2/2003 |
| JP | 2003-068057 | 3/2003 |
| JP | 2003-087744 | 3/2003 |
| JP | 2003-116100 | 4/2003 |
| JP | 2003-199047 | 7/2003 |
| JP | 2003-520514 | 7/2003 |
| JP | 2004-127397 | 4/2004 |
| JP | 2005-513936 | 5/2005 |
| JP | 2005-251392 | 9/2005 |
| KR | 1996-38743 | 11/1996 |
| KR | 1996-38744 | 11/1996 |
| KR | 1996-38901 | 11/1996 |
| KR | 1996-38905 | 11/1996 |
| KR | 1999-0022858 | 3/1999 |
| KR | 2001/0028735 | 9/1999 |
| KR | 1999-0079482 | 11/1999 |
| KR | 2000-0031861 | 6/2000 |
| KR | 2000-0053633 | 8/2000 |
| KR | 2000-0055028 | 9/2000 |
| KR | 2000-0056179 | 9/2000 |
| KR | 2000-0065876 | 11/2000 |
| KR | 2001-0022702 | 3/2001 |
| KR | 10-0294884 | 4/2001 |
| KR | 2001-0051898 | 6/2001 |
| KR | 2001-0098007 | 11/2001 |
| KR | 2001-0098101 | 11/2001 |
| KR | 2001-0107578 | 12/2001 |
| KR | 2002-0006273 | 1/2002 |
| KR | 2002-0006674 | 1/2002 |
| KR | 2002-0020919 | 3/2002 |
| KR | 2002-0097454 | 12/2002 |
| KR | 2002-0097455 | 12/2002 |
| KR | 2004-0000290 | 1/2004 |
| KR | 2004-0030992 | 4/2004 |
| KR | 2004-0030994 | 4/2004 |
| KR | 2004-0030995 | 4/2004 |
| KR | 2004-0041581 | 5/2004 |
| RU | 96101175 | 5/2004 |
| TW | 391548 | 5/2000 |
| WO | WO 97/13364 | 4/1997 |
| WO | WO 97/13365 | 4/1997 |
| WO | WO 97/13366 | 4/1997 |
| WO | WO 97/14151 | 4/1997 |
| WO | WO 97/15924 | 5/1997 |
| WO | WO 97/13361 | 10/1997 |
| WO | WO 97/37491 | 10/1997 |
| WO | WO 97/38527 | 10/1997 |
| WO | WO 97/39451 | 10/1997 |
| WO | WO 98/00952 | 1/1998 |
| WO | WO99/08281 | 2/1999 |
| WO | WO99/38169 | 7/1999 |
| WO | WO 00/02195 | 1/2000 |
| WO | WO 00/05883 | 2/2000 |
| WO | WO 00/42515 | 7/2000 |
| WO | WO 00/46803 | 8/2000 |
| WO | WO00/60597 | 10/2000 |
| WO | WO 00/62295 | 10/2000 |
| WO | WO 01/35648 | 5/2001 |
| WO | WO 01/35650 | 5/2001 |
| WO | WO01/52554 | 7/2001 |
| WO | WO01/82604 | 11/2001 |
| WO | WO01/82606 | 11/2001 |
| WO | WO 01/82608 A1 | 11/2001 |
| WO | WO 01/82609 | 11/2001 |
| WO | WO01/82610 | 11/2001 |
| WO | WO 01/82611 A1 | 11/2001 |
| WO | WO 02/075739 | 9/2002 |
| WO | WO 02/079902 | 10/2002 |
| WO | WO02/080541 | 10/2002 |
| WO | WO03/047261 | 6/2003 |
| WO | WO03/058957 | 7/2003 |
| WO | WO2004/001728 | 12/2003 |
| WO | WO 2004/001749 A1 | 12/2003 |
| WO | WO 2004/001750 | 12/2003 |
| WO | WO 2004/001752 | 12/2003 |
| WO | WO2004/001753 | 12/2003 |
| WO | WO2004/001754 | 12/2003 |
| WO | WO 2004/032142 | 4/2004 |
| WO | WO 2004/047100 | 6/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |

OTHER PUBLICATIONS

Taiwanese Patent Office Action dated May 31, 2007 for counterpart Taiwanese Patent Application No. 093103389 and English language translation thereof.
Japanese Office Action dated May 7, 2008.
United States Office Action dated May 15, 2008.
United States Office Action dated May 21, 2008.
United States Office Action dated Apr. 4, 2008.
Chinese Office Action dated Sep. 5, 2008.
Japanese Office Action dated Nov. 18, 2008.
United States Patent Office Action dated May 14, 2008 for a counterpart U.S. patent application.
Japanese Patent Office Action dated May 20, 2008 for a counterpart Japanese patent application.
Japanese Patent Office Action dated Jun. 20, 2008.
Japanese Patent Office Action dated Jun. 27, 2008.
European Patent Office Search Report dated Sep. 12, 2008 for corresponding European Application No. 04708081.7-2223/1606803.
Japanese Patent Office Action dated Sep. 16, 2008.
Australian Patent Office Action dated Sep. 11, 2008.
Australian Patent Office Action dated Sep. 17, 2008.
European Search Report dated Jun. 19, 2009.
European Search Report dated Jun. 16, 2009.
Hideki Mimura, DVD-Video Format, COMPCON 1997, pp. 291-294.
Hisashi Yamada, DVD Overview Removable Storage Media, 1997, pp. 287-290.

* cited by examiner

US 7,606,463 B2

RECORDING MEDIUM HAVING DATA STRUCTURE FOR MANAGING PLAYBACK CONTROL AND RECORDING AND REPRODUCING METHODS AND APPARATUSES

FOREIGN PRIORITY

The present invention claims priority under 35 U.S.C. 119 on Korean Application No. 10-2003-011522 filed Feb. 24, 2003; the contents of which are incorporated by reference in their entirety.

BACKGROUND OF THE INVENTION

1. Field of the Invention

The present invention relates to a recording medium having a data structure for managing playback control of at least one title as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clip files. The STREAM directory may also include a special type of clip referred to as a bridge-clip A/V stream file. A bridge-clip file is used for making seamless connection between two or more presentation intervals selected in the clip files, and generally have a small data size compared to clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). Expressed another way, the playlist file identifies playitems, each playitem points to a clip file or portion thereof and identifies the clip information file associated with the clip file. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing playback control of a title or titles recorded on the high-density read-only optical disk such as a BD-ROM is not yet available.

SUMMARY OF THE INVENTION

The recording medium according to the present invention includes a data structure for managing playback control of at least one title recorded on the recording medium.

In one exemplary embodiment, a navigation area stores an information file including a plurality of navigation segments representing one or more reproduction paths of a title. Each of the navigation segments includes at least one navigation command. A number of the navigation segments each include a navigation command for launching a playlist, and one of the navigation segments is an entry navigation segment of the title.

In one exemplary embodiment, each branch point along the one or more reproduction paths occurs at a boundary of a launched playlist. In another embodiment, each of the navigation segments forming the one or more reproduction paths of the title includes a navigation command for launching a playlist.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

A high-density recording medium such as a high density optical disk, for example, a Blu-Ray ROM (BD-ROM), BD-RE, etc. in accordance with the invention has a file or data structure for managing reproduction of, for example, video and audio data. Some aspects of the data structure according to the present invention are the same as the well-known BD-RE standard, as such these aspects will not be repeated. Instead, only the different aspects of the data structures according to the embodiments of the present invention will be described in detail for the sake of brevity.

Programs, video and audio data are typically organized as individual titles; for example, different movies represented by video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, interactive titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Figure 1:
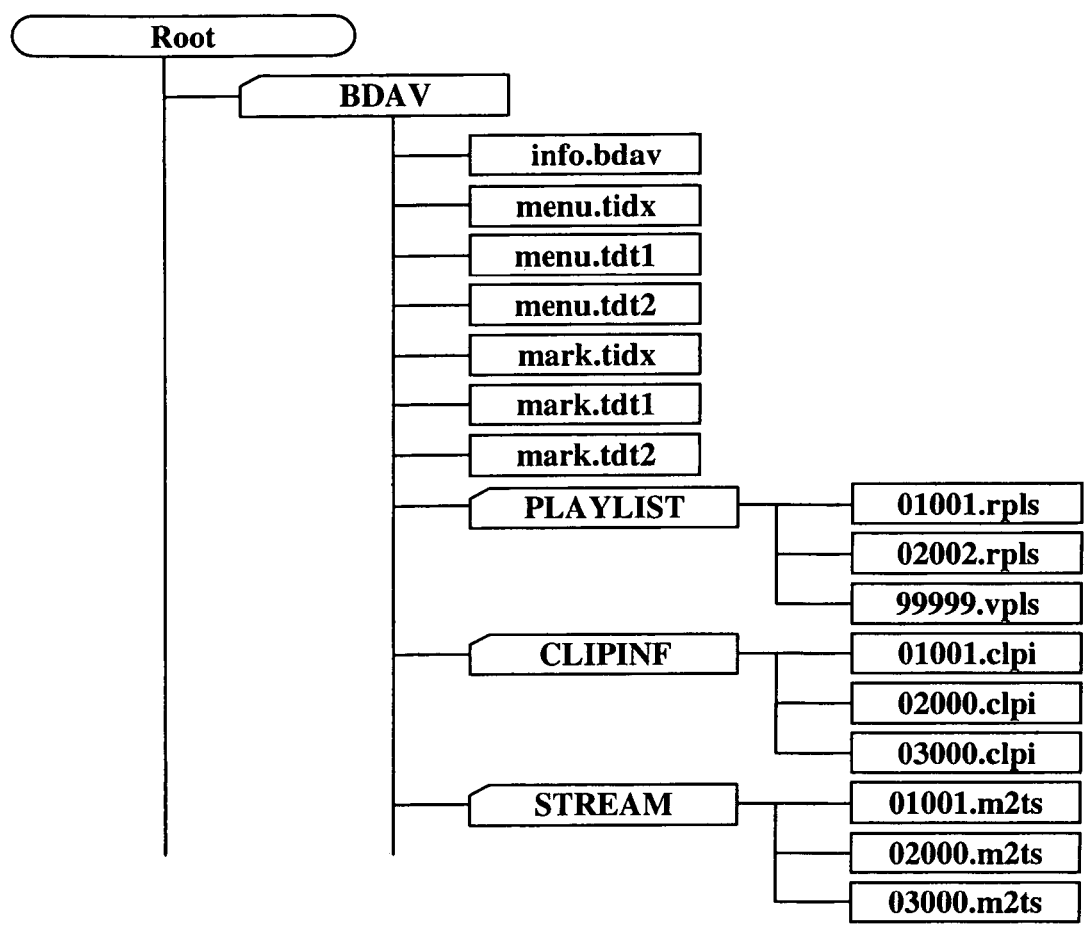
FIG. 1 illustrates the prior art file or data structure of a rewritable optical disk according to the Blu-ray Disc Rewritable (BD-RE) standard.
Figure 2:
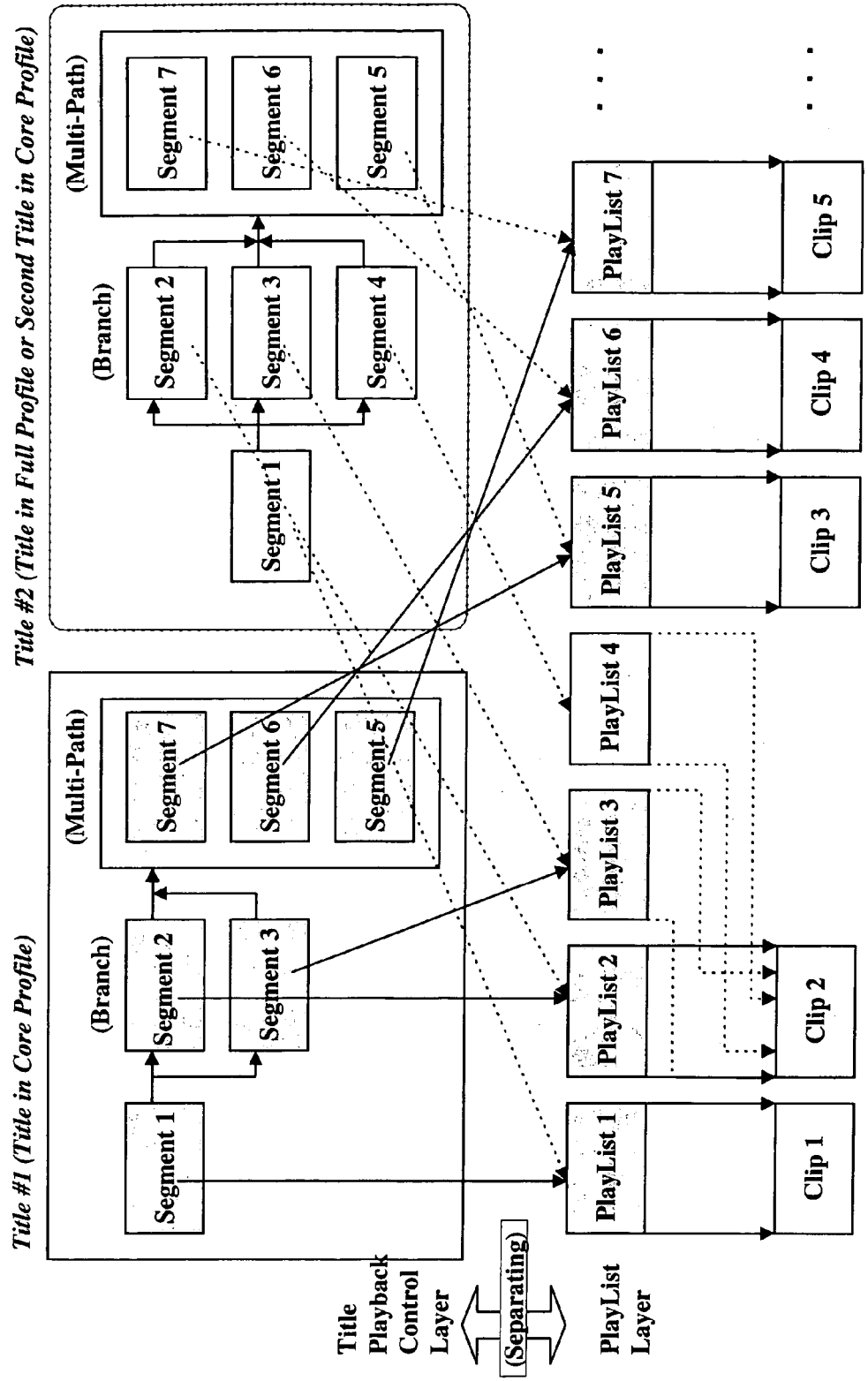
FIG. 2 illustrates an embodiment of a data structure and method for managing playback control of a high-density recording medium such as a BD-ROM.

FIG. 2 illustrates an embodiment of a data structure and method for managing playback control of a title of a high-density recording medium such as a BD-ROM. As shown, A/V streams recorded on a BD-ROM are stored and managed as clip files, and playlists associated with the clip files are managed for playback control of the clip files. In addition, segments associated with the playlists are newly defined and, for example, multiple titles in which some of the segments are arranged in different sequences are managed.

The playlists referencing the recorded A/V stream clip files are managed in a playlist layer, whereas the playback of playlists such as for multiple titles are managed in a title playback control layer. As a result, the clip files, playlists and multi-titles are managed separately.

In FIG. 2, a first title Title #1 contains Segment 1 through Segment 7 linked to each other in a specific sequence, wherein Segments 2 and 3 constitute a branch structure (a branch multi-path structure) and Segments 5, 6, and 7 constitute a multi-path structure. A segment is a navigation command field providing at least one navigation command associated with reproduction of the recording medium. For example, the entry segment, Segment 1, provides navigation commands for playback of PlayList 1. The Segment 2 and Segment 3 provide navigation commands for playback of PlayList 2 and PlayList 3, respectively. While PlayList 2 references and controls playback of the entire A/V stream of Clip 2, PlayList 3 references and controls playback of only a part of the A/V stream of Clip 2.

Similarly, the Segments 5, 6, and 7 provide navigation commands for playback of PlayLists 5, 6, and 7, respectively. As discussed above, Segments 5, 6 and 7 provide navigation information for different reproduction path. For example, the A/V stream referenced by PlayList 5 may be marked as valid in Korea, the A/V stream referenced by PlayList 6 may be marked as valid in the USA, and the A/V stream referenced by PlayList 7 may be marked as valid in Japan.

As shown in FIG. 2, each branch point along the one or more reproduction paths occurs at a boundary of a launched playlist.

Title #2 in FIG. 2 may be recorded and managed as either a complementary second title or a distinct title. In Title #2, Segments 2, 3, and 4 constitute a branch structure and Segments 5, 6, and 7 constitute a multi-path structure. Title #2 may contain playlists that are associated with Title #1 or may only contain new playlists. Again, each branch point along the one or more reproduction paths occurs at a boundary of a launched playlist.

Figure 3:
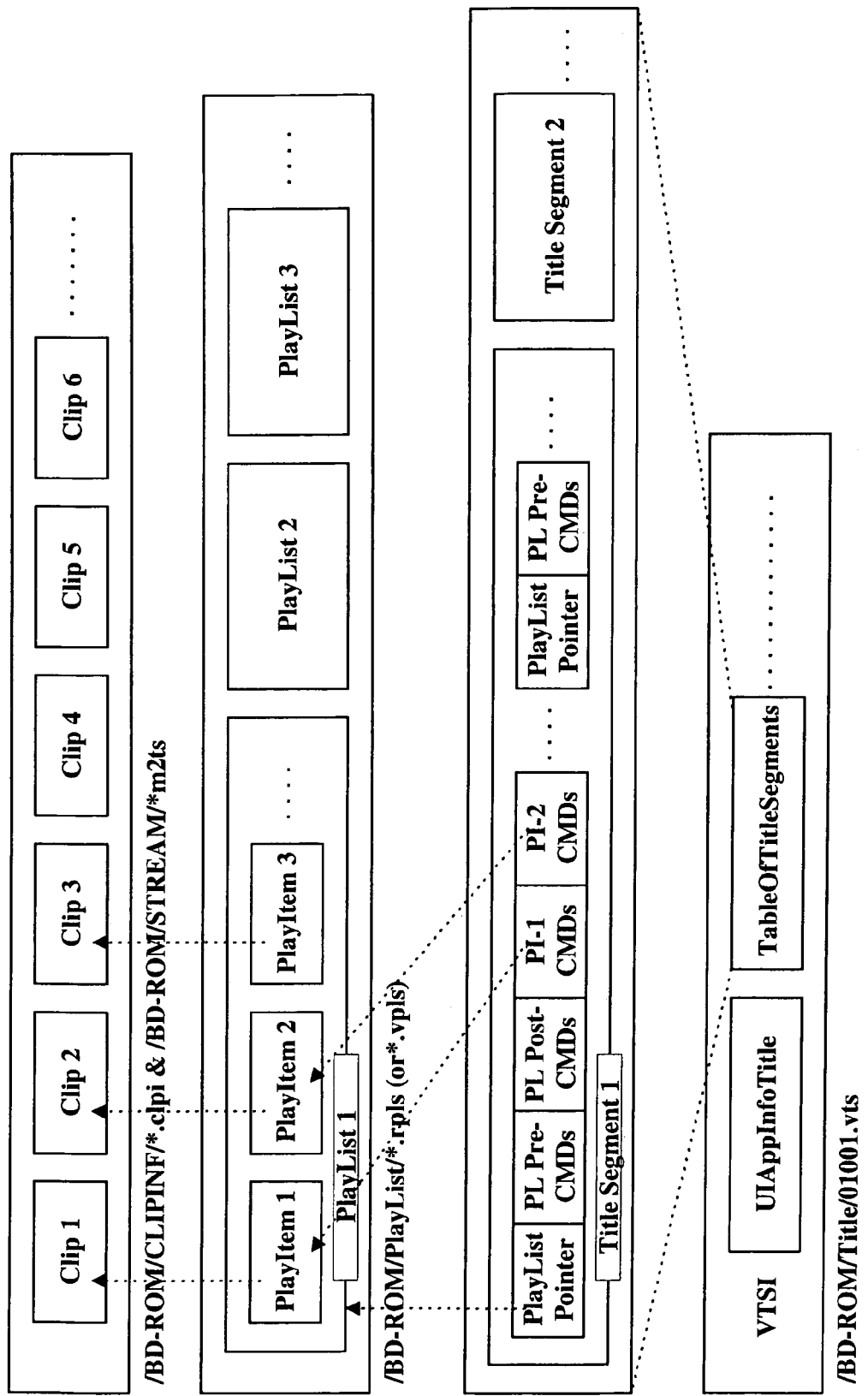
FIG. 3 illustrates an example of a data structure including a TITLE directory.

The playback sequence and playback control information for the segments contained in Title #2 may be recorded by a program such as 'Java Scriptor', whereas the playback sequence and playback control information for the segments contained in Title #1 may be recorded as commands. Titles exclusively for playing main A/V data are classified as core-profile titles and titles having additional contents such as director's commentary are classified as full-profile titles Such titles may be stored in a TITLE directory belonging to the BD-ROM file structure. FIG. 3 illustrates an example of a data structure including a TITLE directory. In FIG. 3, for example, the root directory contains a BD-ROM directory and the BD-ROM directory contains a TITLE directory in which a title file named '01001.vts' is placed.

The navigation information contained in the title file '01001.vts', for example, the VTSI may include user interface application information (UIAppInfTitle), a title segment table (TableOfTitleSegment), etc. Each title segment, such as Title Segment 1 contained in TableOfTitleSegment may include a playlist pointer (PlayList Pointer), playlist pre-commands (PL Pre-CMDs), playlist post-commands (PL Post-CMDs), and playitem commands (PI-CMDs) that correspond to the playitems contained in the corresponding playlist.

A PlayList Pointer is special information for linking the title to a playlist among a plurality of playlists placed in the PLAYLIST directory and the name or number of a playlist is stored in a PlayList Pointer. In FIG. 3, the PlayList Pointer for Title Segment 1 points to PlayList 1.

The PL Pre-CMDs contain initialization information for playback of the A/V data corresponding to the playlist. The PL Post-CMDs contain information used when terminating the playback of the playlist.

A title segment may be associated with a single playlist or more than one playlists. In the latter case, a title segment includes more than one playlist pointer.

The playitems contained in the playlists are associated with the clip information files placed in the CLIPINF directory. Each of the clip information files is in turn associated with a clip file placed in the STREAM directory.

Figure 4:
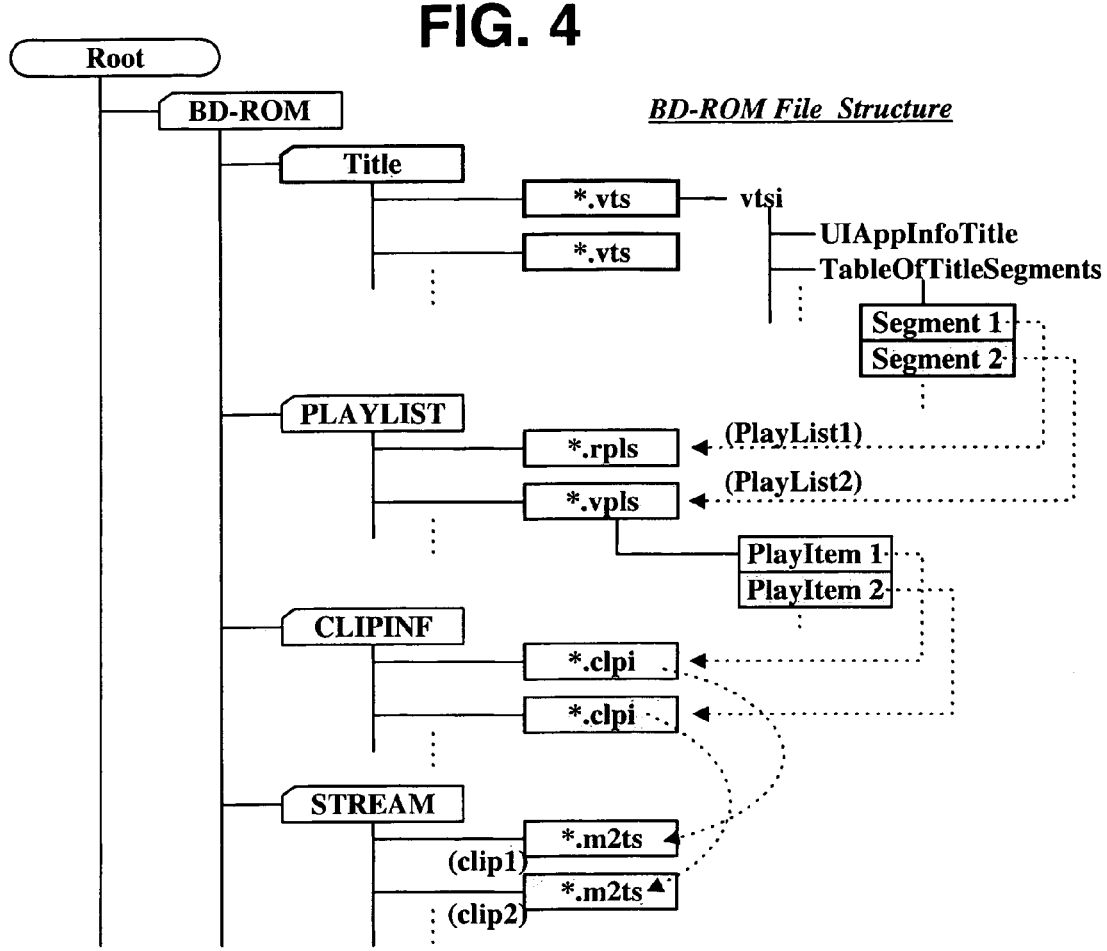
FIG. 4 illustrates another embodiment of a data structure according to the present invention.

FIG. 4 illustrates an embodiment of a data structure according to the present invention. As shown, a root directory includes a BD-ROM directory. The BD-ROM directory includes the TITLE directory containing title files (*.vts) as well as PLAYLIST, CLIPINF, STREAM directories.

The VTSI included in a title file includes UIAppInfTitle and TableOfTitleSegment explained above with reference to FIG. 3. The TableOfTitleSegment contains a list of title segments. Each of the title segments is associated with one or more playlist files. In FIG. 4, Segment 2 is associated with PlayList 2 and the playitems contained in PlayList 2 have corresponding clip information files stored in the CLIPINF directory. The clip information files are associated with clip files (*.m2ts) placed in the STREAM directory.

Figure 5:
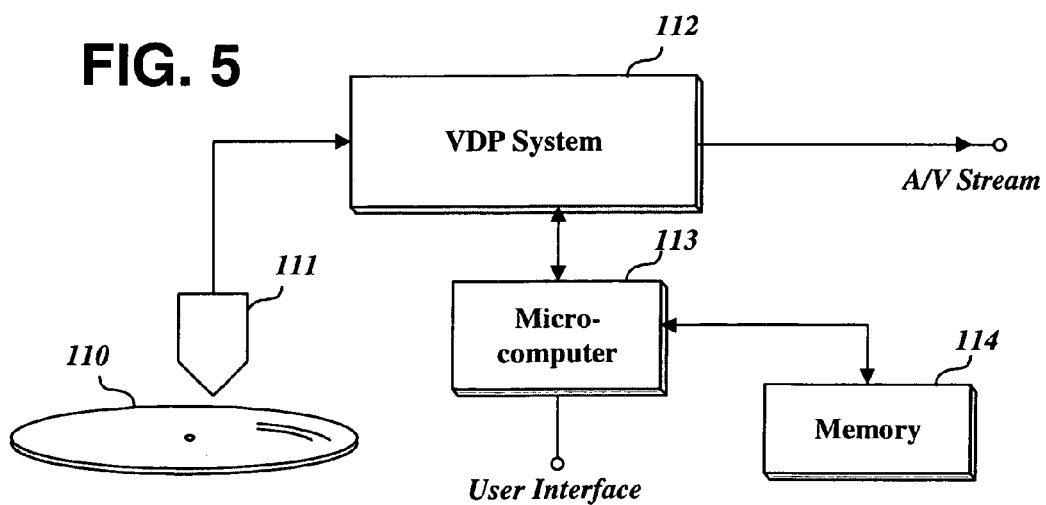
FIG. 5 illustrates a schematic diagram of a partial structure of an optical disc reproducing apparatus where the present invention is applied.

FIG. 5 illustrates a schematic diagram of a partial structure of an optical disc apparatus where the present invention may be applied. As shown, the optical disc apparatus includes an optical pickup 111 for reproducing data from the an optical disk. A VDP (Video Disc Play) system 112 controls the reproduction operation of the optical pickup 111 and demodulates the data reproduced by the optical pickup 111. The VDP system 112 produces an AV stream, which may also be fed to a D/A converter 113 to generate an analog version of the AV stream.

The VDP system 112 controls the optical pickup 111 and demodulates the reproduced data based on user input received from a user interface and the navigation and management information recorded on the optical disk in accordance with the present invention. During reproduction, the reproduced navigation/management information may be stored in a memory 114. The VDP system 112 plays a title by consulting the segments included in the title file, thereby playing A/V streams in various sequences. A playlist is accessed by the corresponding playlist pointer contained in the title segment.

After performing initialization using PL Pre-CMDs contained in the title segment, the optical disk apparatus plays the A/V stream associated with each of the PI-CMDs. After playing the A/V stream, the optical disk apparatus executes subsequent steps such as selection of a title segment in a branch based on the PL-Post CMDs of the playlist.

On the other hand, the TITLE directory may contain both core-profile title files having only main A/V data and full-profile title files having additional contents as well as main A/V data. Alternatively, core-profile title files and full-profile title files may be stored in two separate directories. For example, full-title files may be stored in a FULLTITLE directory.

The BD-ROM directory may contain a directory named CONTENTS in which various contents such as director's commentary constituting a full-profile title file are stored. Navigation information for the contents files is recorded in the full-profile title file; therefore various contents can be played together with the main A/V data.

Figure 6:
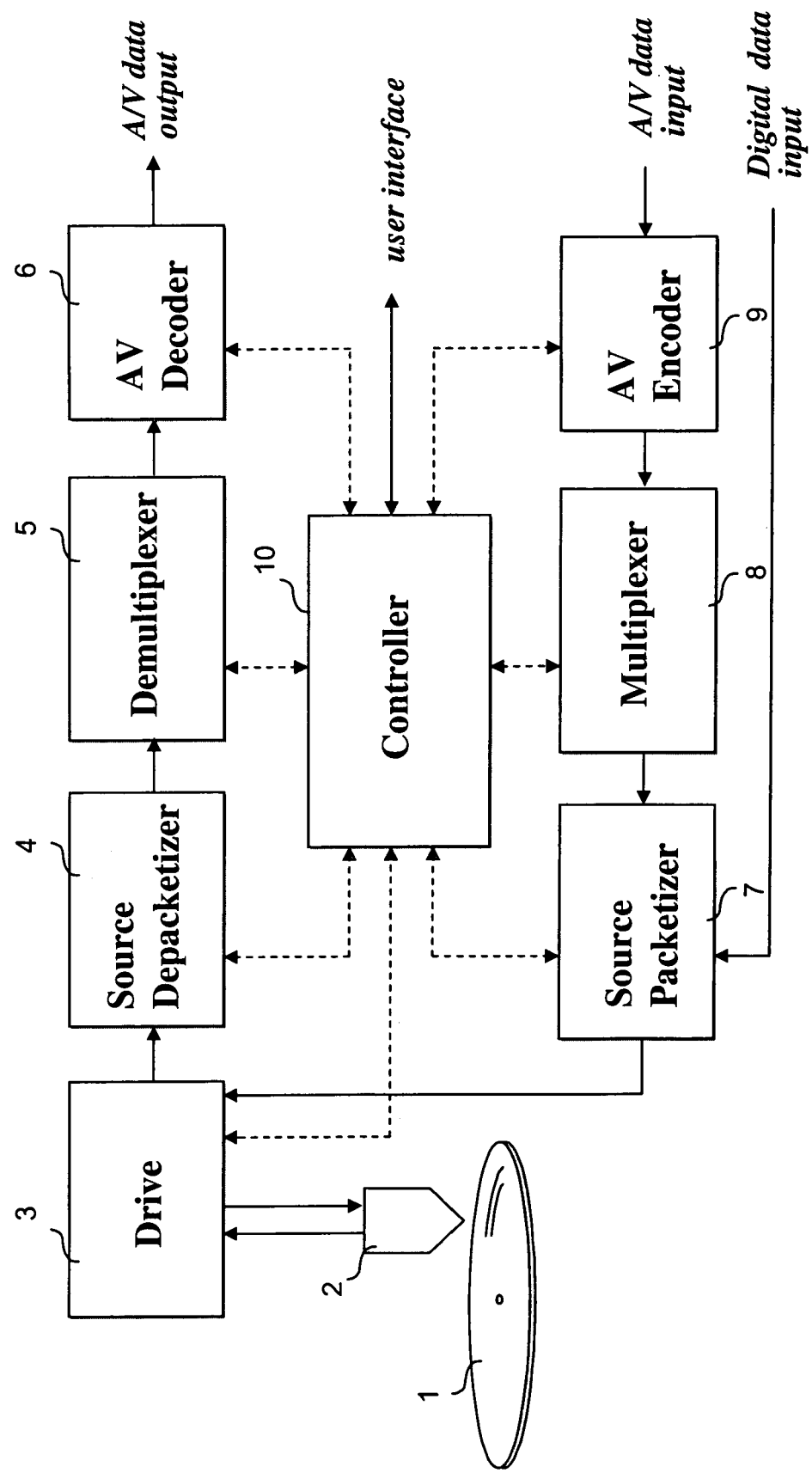
FIG. 6 illustrates an embodiment of a recording and reproducing apparatus according to the present invention.

FIG. 6 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.), the controller 10 controls the drive 3 to record one or more of the data structures of FIGS. 2-4 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 6 has been described as a recording and reproducing apparatus, it will be understood that only a recording or only a reproducing apparatus may be provided using those portions of FIG. 6 providing the recording or reproducing function.

The data structure for and method for managing playback control of a high-density recording medium in accordance with embodiments of the present invention allows effective selection and reproduction of data streams recorded on a high density recording medium such as a BD-ROM.

As apparent from the above description, the present invention provides methods and apparatuses for recording a data structure on a high density recording medium for managing playback control of the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium having a data structure for managing playback control of video data having multiple reproduction paths, comprising:
   a data area storing a stream file including the video data;
   a playlist area storing a first playlist file and a second playlist file including at least one playitem identifying a playing interval in a clip of the video data respectively, the first and second playlist files identifying video data of different reproduction paths from each other, and the playing interval including an IN-point and OUT-point indicating positions of the clip; and
   a navigation area storing a navigation file including first and second navigation segments, the first navigation segment and the second navigation segment including a first navigation command and a second navigation command launching the first playlist file and the second playlist file respectively such that the first navigation segment and the second navigation segment represent different reproduction paths of a title of the video data, where the stream file, the first and second playlist files, and the navigation file are separate from each other.

2. The recording medium of claim 1, wherein the multiple reproduction paths constitute a branch structure.

3. The recording medium of claim 2, wherein a branch point of the branch structure is a boundary of the playlist file.

4. The recording medium of claim 1, further comprising:
   a clip information file area storing at least one clip information file associated with the stream file.

5. A method of recording a data structure for managing playback control of video data having multiple reproduction paths on a recording medium, comprising:
   recording a stream file including the video data in a data area of the recording medium;
   recording a first playlist file and a second playlist file including at least one playitem identifying a playing interval in a clip of the video data respectively in a playlist area of the recording medium, the first and second playlist files identifying video data having different reproduction paths from each other, and the playing interval including an IN-point and OUT-point indicating positions of the clip; and
   recording a navigation file including a first and second navigation segments in a navigation area of the recording medium, the first navigation segment and the second navigation segment including a first navigation command and a second navigation command launching the first playlist file and the second playlist file respectively such that the first navigation segment and the second navigation segment represent different reproduction paths of a title of the video data, where the stream file, the first and second playlist files, and the navigation file are separate from each other.

6. The method of claim 5, wherein the multiple reproduction paths constitute a branch structure.

7. The method of claim 5, wherein a branch point of the branch structure is a boundary of the playlist file.

8. A method of reproducing a data structure for managing playback control of video data having multiple reproduction paths recorded in a recording medium, comprising:
   reproducing a stream file of the video data from a data area of the recording medium;
   reproducing a first playlist file and a second playlist file including at least one playitem identifying a playing interval in a clip of the video data respectively from a playlist area of the recording medium, the first and second playlist files identifying video data having different reproduction paths from each other, and the playing interval including an IN-point and OUT-point indicating positions of the clip; and
   reproducing a navigation file including a first and a second navigation segments from a navigation area of the recording medium, the first navigation segment and the second navigation segment including a first navigation command and a second navigation command launching the first playlist file and the second playlist file respectively such that the first navigation segment and the second navigation segment represent different reproduction paths of a title of the video data, where the stream file, the first and second playlist files, and the navigation file are separate from each other.

9. The method of claim 8, wherein the multiple reproduction paths constitute a branch structure.

10. The method of claim 8, wherein a branch point of the branch structure is a boundary of the playlist file.

11. An apparatus for recording a data structure for managing playback control of video data having multiple reproduction paths on a recording medium, comprising:
   a pickup configured to record a stream file of the video data in a data area of the recording medium; and
   a controller configured to control the pickup to record a first playlist file and a second playlist file including at least one playitem identifying a playing interval in a clip of the video data respectively in a playlist area of the recording medium, the first and second playlist files identifying video data having different reproduction paths from each other, and the playing interval including an IN-point and OUT-point indicating positions of the clip, and to record a navigation file including a first and a second navigation segments in a navigation area of the recording medium, the first navigation segment and the second navigation segment including a first navigation command and a second navigation command launching the first playlist file and the second playlist file respectively such that the first navigation segment and the second navigation segment represent different reproduction paths of a title of the video data, where the stream file, the first and second playlist files, and the navigation file are separate from each other.

12. The apparatus of claim 11, wherein the multiple reproduction paths constitute a branch structure.

13. An apparatus for reproducing a data structure for managing playback control of video data having multiple reproduction paths recorded in a recording medium, comprising:

a pickup configured to reproduce a stream file of the video data from a data area of the recording medium; and a controller configured to control the pickup to reproduce a first playlist file and a second playlist file including at least one playitem identifying a playing interval in a clip of the video data respectively from a playlist area of the recording medium, the first and second playlist files identifying video data having different reproduction paths from each other, and the playing interval including an IN-point and OUT-point indicating positions of the clip, and to reproduce a navigation file including first and second navigation segments from a navigation area of the recording medium, the first navigation segment and the second navigation segment including a first navigation command and a second navigation command launching the first playlist file and the second playlist file respectively such that the first navigation segment and the second navigation segment represent different reproduction paths of a title of the video data, where the stream file, the first and second playlist files, and the navigation file are separate from each other.

14. The apparatus of claim 13, wherein the multiple reproduction paths constitute a branch structure.

* * * * *